(12) United States Patent
Ando et al.

(10) Patent No.: US 12,337,638 B2
(45) Date of Patent: Jun. 24, 2025

(54) SHOCK ABSORBER

(71) Applicant: KYB CORPORATION, Tokyo (JP)

(72) Inventors: Kazuma Ando, Tokyo (JP); Tomohiro Kimizu, Tokyo (JP)

(73) Assignee: KYB CORPORATION, Tokyo (JP)

( * ) Notice: Subject to any disclaimer, the term of this patent is extended or adjusted under 35 U.S.C. 154(b) by 441 days.

(21) Appl. No.: 17/924,584

(22) PCT Filed: May 6, 2021

(86) PCT No.: PCT/JP2021/017342
§ 371 (c)(1),
(2) Date: Nov. 10, 2022

(87) PCT Pub. No.: WO2022/009511
PCT Pub. Date: Jan. 13, 2022

(65) Prior Publication Data
US 2023/0182521 A1 Jun. 15, 2023

(30) Foreign Application Priority Data
Jul. 6, 2020 (JP) .................................. 2020-116054

(51) Int. Cl.
*B60G 13/00* (2006.01)
*F16F 9/54* (2006.01)

(52) U.S. Cl.
CPC ........ *B60G 13/006* (2013.01); *B60G 2202/24* (2013.01); *B60G 2204/129* (2013.01);
(Continued)

(58) Field of Classification Search
CPC ........................... B60G 13/001; B60G 13/006; B60G 2202/24; B60G 2204/129;
(Continued)

(56) References Cited

U.S. PATENT DOCUMENTS 5,145,204 A * 9/1992 Perkins .................... B60G 3/20
267/221
5,170,973 A * 12/1992 Ohta .................... B60G 13/006
248/230.2
(Continued)

FOREIGN PATENT DOCUMENTS

JP  H02-126908 U  10/1990
JP  H04-321807 A  11/1992
(Continued)

OTHER PUBLICATIONS

Jul. 20, 2021, International Search Report issued for related PCT Application No. PCT/JP2021/017342.
(Continued)

*Primary Examiner* — Thomas W Irvin
(74) *Attorney, Agent, or Firm* — Paratus Law Group, PLLC

(57) ABSTRACT

A shock absorber according to the present invention includes: a shock absorber main body having an outer shell and a rod; and a knuckle bracket attached to an outer circumference of the bottom end of the outer shell. The knuckle bracket includes: a holding portion having a cylindrical shape with a C-shaped cross section, and that holds the outer circumference of the outer shell; a pair of attachment portions extending radially outwards, and in parallel with each other, from respective circumferential ends of the holding portion; and reinforcing portions formed by bending top ends of the attachment portions in directions approaching each other; and a C-shaped welded portion having a C-shaped surface that is formed by top ends of the reinforcing portions and a top end of the holding portion, the C-shaped welded portion being formed by welding the C-shaped surface to the outer shell, across a range from a position spaced from one circumferential end of the
(Continued)

C-shaped surface, traversing across an upper part of a rear side of the holding portion, to the other circumferential end of the C-shaped surface.

5 Claims, 3 Drawing Sheets

(52) U.S. Cl.
CPC .. *B60G 2204/4304* (2013.01); *B60G 2206/41* (2013.01); *B60G 2206/8201* (2013.01)

(58) Field of Classification Search
CPC ........ B60G 2204/4304; B60G 2206/41; B60G 2206/8201; F16F 9/54
See application file for complete search history.

(56) References Cited

U.S. PATENT DOCUMENTS

| | | | | |
|---|---|---|---|---|
| 5,669,728 | A * | 9/1997 | Koba | B60G 15/07 |
| | | | | 280/124.1 |
| 5,730,547 | A * | 3/1998 | Nogami | B60G 13/006 |
| | | | | 280/124.1 |
| 5,772,168 | A * | 6/1998 | Nakazawa | B60G 13/006 |
| | | | | 248/300 |
| 6,533,230 | B2 * | 3/2003 | Fullenkamp | B60G 15/07 |
| | | | | 248/300 |
| 6,684,990 | B2 * | 2/2004 | Takakusaki | F16F 9/062 |
| | | | | 280/124.155 |
| 7,628,415 | B2 * | 12/2009 | Kitamura | B60G 3/06 |
| | | | | 280/124.145 |
| 8,047,342 | B2 * | 11/2011 | Nagasawa | F16F 9/54 |
| | | | | 188/321.11 |
| 9,649,905 | B2 * | 5/2017 | Hernette | F16F 9/3235 |
| 11,300,173 | B2 * | 4/2022 | Shibata | F16F 9/54 |
| 2002/0027050 | A1 * | 3/2002 | Takakusaki | F16F 9/062 |
| | | | | 188/321.11 |
| 2007/0278726 | A1 * | 12/2007 | Nagasawa | F16F 9/54 |
| | | | | 267/195 |
| 2016/0031282 | A1 * | 2/2016 | Hernette | F16F 13/007 |
| | | | | 280/124.125 |
| 2019/0309816 | A1 * | 10/2019 | Shibata | F16F 9/3235 |
| 2023/0331054 | A1 * | 10/2023 | Tanaka | B60G 13/008 |
| 2024/0399809 | A1 * | 12/2024 | Matsuoka | F16F 9/32 |
| 2024/0399810 | A1 * | 12/2024 | Matsuoka | B60G 13/18 |

FOREIGN PATENT DOCUMENTS

| | | |
|---|---|---|
| JP | H11-190380 A | 7/1999 |
| JP | H11-280825 A | 10/1999 |
| JP | 2002-295569 A | 10/2002 |
| JP | 2009-216129 A | 9/2009 |
| JP | 2002-372090 A | 12/2022 |

OTHER PUBLICATIONS

Jul. 20, 2021, International Search Opinion issued for related PCT Application No. PCT/JP2021/017342.
Jul. 6, 2022, International Preliminary Report on Patentability issued for related PCT Application No. PCT/JP2021/017342.

* cited by examiner

SHOCK ABSORBER

CROSS REFERENCE TO PRIOR APPLICATION

This application is a National Stage Patent Application of PCT International Patent Application No. PCT/JP2021/017342 (filed on May 6, 2021) under 35 U.S.C. § 371, which claims priority to Japanese Patent Application No. 2020-116054 (filed on Jul. 6, 2020), which are all hereby incorporated by reference in their entirety.

TECHNICAL FIELD

The present invention relates to a shock absorber.

BACKGROUND ART

A shock absorber includes an outer shell and a rod that is movably inserted into the outer shell, and is used by being incorporated in a suspension in a vehicle, for example, to suppress the vibration of the vehicle body and the wheel. As the piston rod moves in the axial directions with respect to the outer shell, the shock absorber becomes extended and contracted, and exert a damping force thereby.

When such a shock absorber incorporated in a suspension is used in a strut suspension, for example, a knuckle bracket, which is for attaching a knuckle for holding a wheel of a vehicle, is attached, by welding, to the bottom end of the outer shell.

Such a knuckle bracket includes, for example, a cylindrical holding portion having a C-shaped cross section and that holds an outer circumference of the outer shell; a pair of attachment portions that are can be coupled to the knuckle, and that extends radially outwards, and in parallel with each other, from two respective circumferential ends of the holding portion; and reinforcing portions formed by bending respective top ends of the attachment portions in directions approaching each other.

The knuckle bracket is integrated with the outer shell by welding the top end and the bottom end of the knuckle bracket to the outer circumference of the outer shell at the bottom end. To bear the load applied from the wheel to the shock absorber, it is necessary to join the outer shell to the knuckle bracket firmly.

Therefore, is a knuckle bracket in a conventional shock absorber, as disclosed in JP 2002-372090 A or JP 2009-216129 A, for example, the top surface of the reinforcing portions and the top surface of the holding portion are provided in a manner being flush with each other, and the knuckle bracket is welded to the outer circumference of the outer shell using the top end surfaces of the reinforcing portions and the holding portion as the welding surface (see, for example, Patent Literatures 1 and 2).

In the knuckle bracket included in the shock absorber having the configuration described above, because the surfaces to be welded are flush with each other, filler metal, having melted in the process of welding to the outer shell, is better accumulated on the welding surface. Therefore, it is possible to manufacture a shock absorber having sufficient strength with no welding defect.

CITATION LIST

Patent Literature

Patent Literature 1: JP 2002-72090 A
Patent Literature 2: JP 2009-216129 A

SUMMARY OF INVENTION

Technical Problem

In the shock absorber having the configuration described above, because the outer shell and the knuckle bracket are firmly joined to each other, there is no particular problem in the use in vehicles at present.

However, the weight of a vehicle has been increasing constantly, mainly because reconsiderations have been given to the frame structures and the like, due to the enhancement in safety standards, installations of preventive safety devices, and an increased number of pieces of onboard equipment for improving comfort. Therefore, it is predictable for the shock absorber used in a strut suspension to be required to bear a greater vehicle weight, and further improvement of the joining strength between the outer shell and the knuckle bracket will be required so that a higher load can be tolerated.

At this time, when the knuckle bracket is welded to the outer shell, the outer shell and the knuckle bracket are clamped together to bring the attachment portions near each other, and to prevent a gap from being formed between the outer shell and the welding surface described above. However, because the reinforcing portions are manufactured by bending, as described above, springback may cause the shape to return, and a gap may be formed between the circumferential ends that are the welding surface and the outer circumference of the outer shell.

If there is a wide gap between the welding surface and the outer shell, as described above, the materials of the knuckle bracket and the outer shell, which are being welded, may fail to become sufficiently fused with the filler metal inside the gap. As a result, a bead a large portion of which is the filter metal may be formed as a welded portion.

Such a welded portion is brittle and has a lower joining strength, compared with a welded portion where the materials to be welded are sufficiently fused. Therefore, when the welded portion is subjected to a vibration test in which high loads are applied repeatedly, the welded portion may crack, without satisfying the number of times that would be required for the shock absorber to withstand.

Therefore, an object of the present invention is to provide a shock absorber capable of enhancing the joining strength between an outer shell and a knuckle bracket, and of improving the tolerance against repeated applications of high load.

Solution to Problem

In order to solve the above problems, a shock absorber according to the present invention includes a shock absorber main body including an outer shell and a rod movably inserted into the outer shell; and a knuckle bracket attached, by welding, to an outer circumference of a bottom end of the outer shell. The knuckle bracket includes: a holding portion that has a cylindrical shape with a C-shaped cross section with a split on the front side, and that holds the outer circumference of the outer shell; a pair of attachment portions that extend radially outwards, and in parallel with each other, from two respective circumferential ends of the holding portions, and that can be coupled to a knuckle in a vehicle; and reinforcing portions formed by bending top ends of the attachment portions in directions approaching each other, and that holds the outer circumference of the outer shell together with the holding portion; a C-shaped welded portion having a C-shaped surface formed by top ends of the reinforcing portions and a top end of the holding portion, and welded along the outer circumference of the outer shell, the C-shaped welded portion being formed by welding the C-shaped surface to the outer shell across a range from a position spaced from one circumferential end of the C-shaped surface, traversing across an upper portion of the holding portion on the rear side, to the other circumferential end of the C-shaped surface.

With the shock absorber having the configuration described above, because the knuckle bracket and the outer shell are welded except for the one circumferential end of the C-shaped surface of the knuckle bracket, the one circumferential end corresponding to the tip of the reinforcing portion where it is likely for a gap to be formed between the knuckle bracket and the outer shell, the joining strength in the welded portion between the knuckle bracket and the outer shell is improved, and a welded portion with a tolerance against repeated applications of high loads can be achieved.

Furthermore, the welded portion in the shock absorber may be formed by welding the C-shaped surface to the outer shell across a range from a position spaced from one circumferential end of the C-shaped surface, traversing across an upper part of the holding portion, to a position spaced from the other circumferential end. With the shock absorber having the configuration described above, because the knuckle bracket and the outer shell are welded except for the two circumferential ends of the C-shaped surface of the knuckle bracket, the two circumferential ends corresponding to the tip of the reinforcing portion where it is likely that a gap is formed between the knuckle bracket and the outer shell, the joining strength of the welded portion between the knuckle bracket and the outer shell is further improved, and a welded portion having higher tolerance against repeated applications of high load can be achieved.

Furthermore, the welded portion in the shock absorber may be provided from a point of intersection between the C-shaped surface and a line extended from one of the attachment portions as a start point, to a point of intersection between the C-shaped surface and a line extend from the other attachment portion as an end point, in a view of the knuckle bracket from the front side in a direction facing the attachment portions. With the shock absorber having the configuration described above, because the welded portion can be provided while avoiding the part where the reinforcing portions are not easily deformable, the welded portion having a high strength as a whole can be achieved reliably. In addition, because it is possible to establish a range to be welded, between the knuckle bracket and the outer shell in advance, the welding task is made easier.

Advantageous Effects of Invention

With the shock absorber according to the present invention, the joining strength between the outer shell and the knuckle bracket can be increased to improve the tolerance against repeated applications of high load.

DESCRIPTION OF EMBODIMENTS

Figure 1:
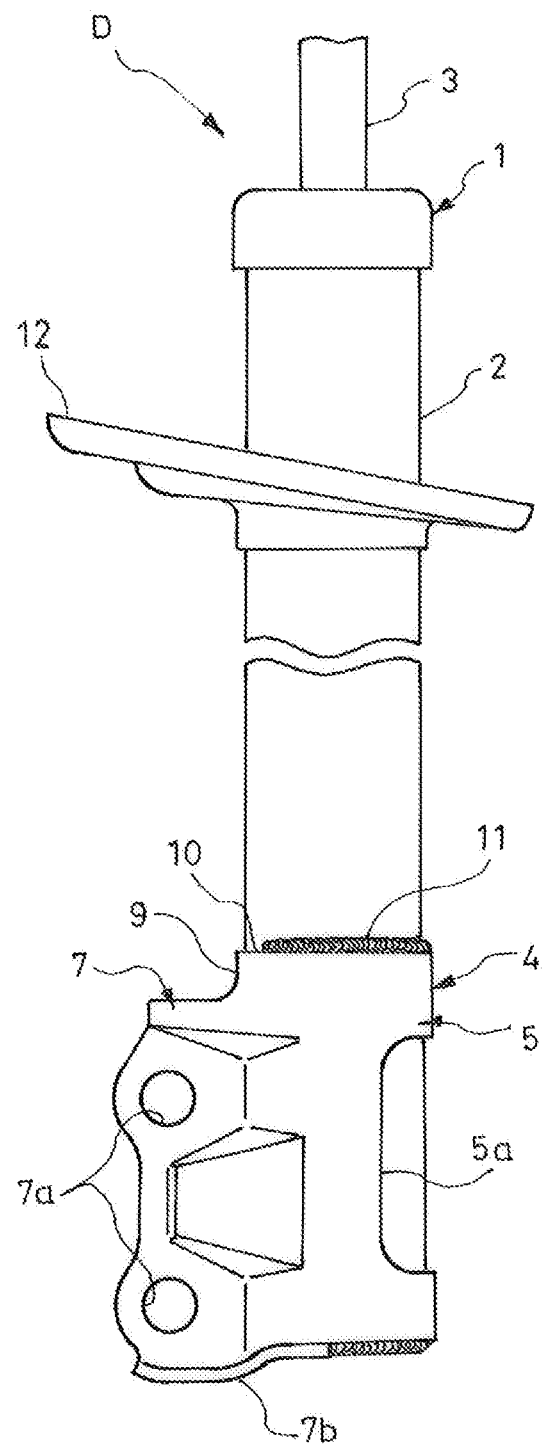
FIG. 1 is a side view of a shock absorber according to an embodiment.
Figure 2:
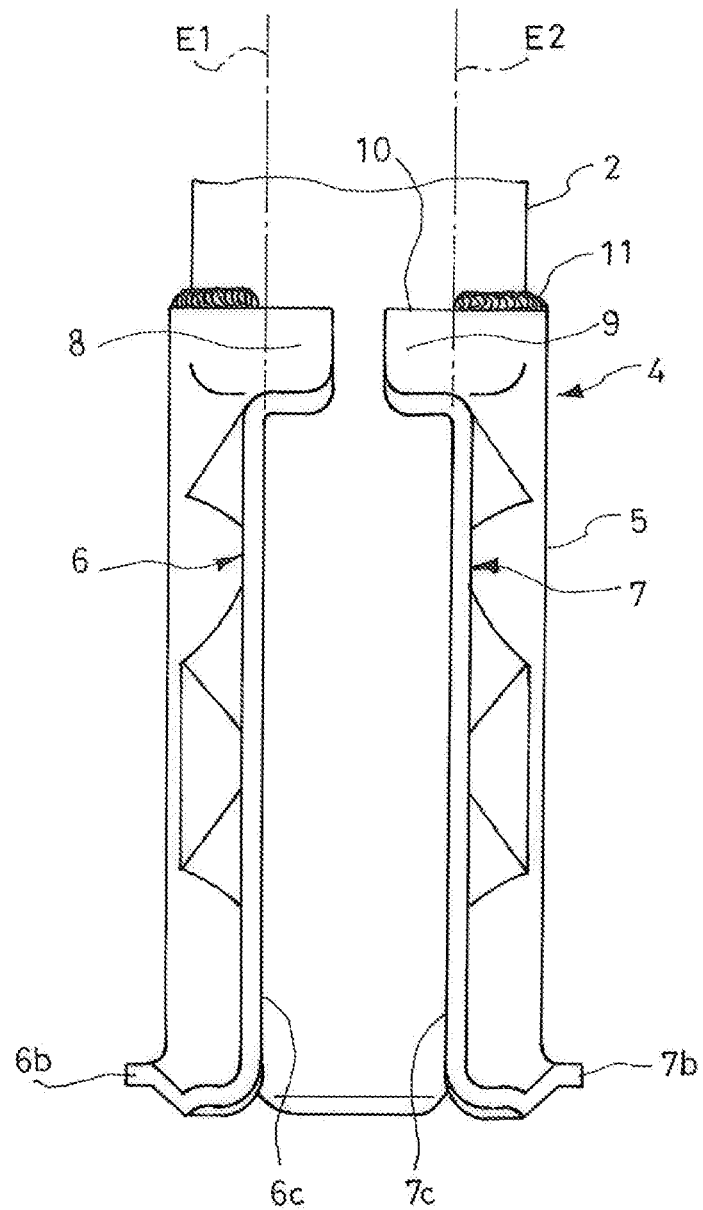
FIG. 2 is a front view of a knuckle bracket in the shock absorber according to the embodiment.

The present invention will now be explained based on the embodiment illustrated in drawings. As illustrated in FIGS. 1 and 2, a shock absorber D includes a shock absorber main body 1 having an outer shell 2 and a rod 3 that is movably inserted into the outer shell 2, and a knuckle bracket 4 that is attached, by welding, to an outer circumference of the bottom end of the outer shell 2, and is interposed between a vehicle body and a wheel of the vehicle by connecting the shock absorber D to a knuckle that supports the wheel, not illustrated, in the vehicle using that uses the knuckle bracket 4.

Each part of the shock absorber D will now be explained in detail. The shock absorber main body 1 includes a cylindrical outer shell 2 and a rod 3 that is movably inserted into the outer shell 2, and dampens the vibration of the vehicle body and the wheel, by generating a damping force for inhibiting a relative movement of the rod 3 with respect to the outer shell 2, through an extending and contracting movement, in which the rod 3 moves relatively with respect to the outer shell 2 in the axial directions.

The shock absorber main body 1 includes, for example, a cylindrical outer shell 2 the bottom end of which is closed, a cylinder (not illustrated) that is housed inside the outer shell 2, the rod 3 that is movably inserted into the cylinder, a piston connected to the rod 3 and inserted into the cylinder to partition the internal space of the cylinder into an extension side chamber and a compression side chamber, a reservoir that is formed between the cylinder and the outer shell, and a valve case that is provided to the bottom end of the cylinder to provide a partition between the compression side chamber and the reservoir. The extension side chamber and the compression side chamber are filled with liquid such as hydraulic oil, and the reservoir is filled with liquid and gas. Note that liquid other than the hydraulic oil such as water and an aqueous solution may also be used as the liquid used in the shock absorber D.

In the piston, damping valves are provided inside a passage where the extension side chamber communicates with the compression side chamber, and in a passage where the compression side chamber communicates with the reservoir, respectively. In the shock absorber main body 1 having the configuration described above, during its extending and contracting movement, the extension side chamber and the compression side chamber are expanded and compressed by the piston, and the liquid moves through the passages. The damping valve generate a damping force by resisting the liquid flow.

Note that a lower suspension spring seat 12 supporting the bottom end of a suspension spring, not illustrated, is mounted on of the middle of the outer circumference of the outer shell 2. This suspension spring not illustrated is interposed between the upper suspension spring bearing mounted on the tip end of the rod 3 and the lower suspension spring seat 12 described above, and, when the shock absorber D is interposed between the vehicle body and the wheel, the shock absorber D supports the vehicle body elastically.

The knuckle bracket 4 is formed by bending a single piece of a metal base material. The knuckle bracket 4 includes a holding portion 5 that has a cylindrical shape with a C-shaped cross section and that holds the outer circumference of the outer shell 2, a pair of attachment portions 6, 7 that extend radially outwards, and in parallel with each other, from the respective circumferential ends of the holding portion 5, and that can be coupled to the knuckle in the vehicle, not illustrated, reinforcing portions 8, 9 that are formed by bending the top ends of the attachment portions 6, 7 in directions approaching each other in a manner holding the outer circumference of the outer shell 2 together with the holding portion 5, and a C-shaped surface 10 that is formed by the top ends of the reinforcing portions 8, 9 and the top end of the holding portion 5, and that is welded to and along the outer circumference of the outer shell 2.

As illustrated in FIGS. 1 and 2, the holding portion 5 has a cylindrical shape having a C-shaped cross section, with a split on the front side, and has a rectangular cutout 5*a* at the center of the rear side in a view from the front side. The cutout 5*a* is provided to reduce the weight of the knuckle bracket 4, and may be omitted.

The attachment portions 6, 7 extend outwards from the respective two ends of the holding portion 5, in parallel with each other and facing each other, from the two respective circumferential ends of the holding portion 5. Each of the attachment portions 6, 7 has two bolt insertion holes 6*a*, 7*a* at positions facing two respective holes that are provided to an attachment portion of the knuckle, not illustrated. The knuckle bracket 4 can be attached to the knuckle, by inserting the attachment portion of the knuckle between the attachment portions 6, 7, and bolt-fastening the attachment portions 6, 7 to the attachment portion of the knuckle, with bolts that are passed through the attachment portion of the knuckle, and nut not illustrated, that are inserted into the bolt insertion holes 6*a* and 7*a*, respectively. The bottom ends of the attachment portions 6, 7 are bent outwards, and are provided with flanges 6*b* and 7*b*, respectively, so as to improve the strength of the attachment portions 6, 7.

Furthermore, the top ends of the attachment portions 6, 7 are bent in inward directions that are directions approaching each other by bending, to form the reinforcing portions 8, 9 thereby. As illustrated in FIGS. 1 and 2, by bending the top ends of the attachment portions 6, 7 toward the holding portion 5, that is, by folding the top ends inward of the knuckle bracket 4 in a concave shape, the top ends of the reinforcing portions 8, 9 come to be flush with the top end of the holding portion 5 to form one surface, and the reinforcing portions 8, 9 hold the outer circumference of the outer shell 2 together with the holding portion 5. In this manner, the top ends of the reinforcing portions 8, 9 and the top end of the holding portion 5 come to be flush with each other as described above, and together form one C-shaped surface, that is, the C-shaped surface 10, extending along the outer circumference of the outer shell 2.

The top end and the bottom end of the knuckle bracket 4 are joined, by welding, to the outer circumference of the outer shell 2, and are fixed to the outer shell 2. On the bottom end of the knuckle bracket 4, the entire bottom end of the holding portion 5 is welded, by arc welding, to the outer circumference of the bottom end of the outer shell 2, in the circumferential direction.

Figure 3:
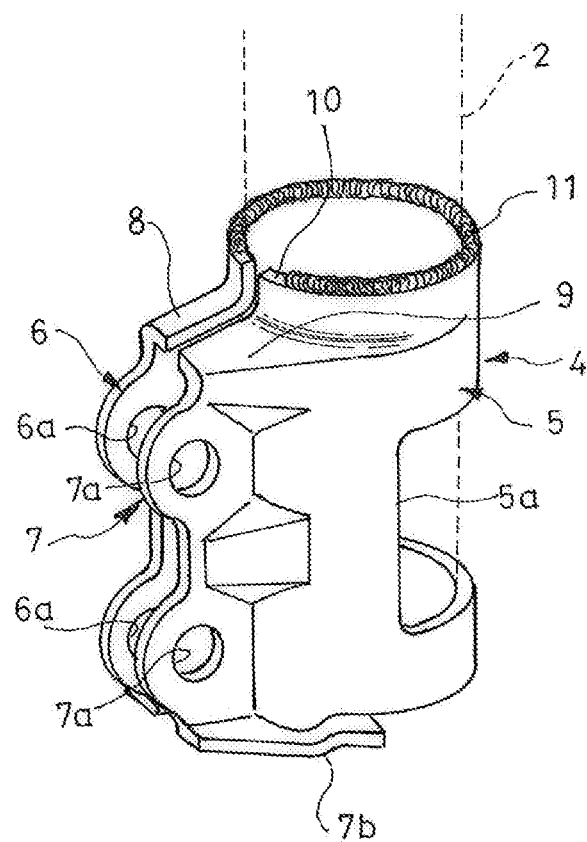
FIG. 3 is a perspective view of the knuckle bracket in the shock absorber according to the embodiment.

On the top end side of the knuckle bracket 4, the C-shaped surface 10 is arc-welded to the outer circumference of the outer shell 2, to form the C-shaped welded portion 11. As illustrated in FIG. 3, the welded portion 11 is formed as a fusion of the materials to be welded and the filler metal, and is formed across a range from a position spaced from one circumferential end of the C-shaped surface 10, traversing across the upper part of the holding portion 5, to a position spaced from the other circumferential end of the holding portion. In other words, the welded portion 11 is not provided at the respective two circumferential ends of the C-shaped surface, and the entire C-shaped surface 10 except for these ends is welded to the outer shell 2.

Specifically, in the shock absorber D according to the present embodiment, the outer diameter of the outer shell 2 is 50 mm, the plate thickness of the knuckle bracket 4 is 3 mm, and the welded portion 11 is formed across a range from a start point at a position spaced by a distance of 5 mm or more and 10 mm or less from the one circumferential end of the C-shaped surface 10, across the top end of the holding portion 5 on the rear side, and reaching an end point at a position spaced by a distance of 5 mm or more and 10 mm or less from the other circumferential end of the C-shaped surface 10.

When the knuckle bracket 4 is welded to the outer shell 2, the attachment portions 6, 7 are clamped in a manner bringing the attachment portions 6, 7 closer to each other so that the C-shaped surface 10 of the knuckle bracket 4 is brought to close contact with the outer circumference of the outer shell 2. However, the reinforcing portions 8, 9, which are provided to improve the strength of the knuckle bracket 4, are not easily deformable. Therefore, even if the tips of the top ends of the reinforcing portions 8, 9, that is, the attachment portions 6, 7 are clamped with each other, there still may be a gap between the two circumferential ends of the C-shaped surface 10 and the outer shell 2.

Even if there is a gap between the C-shaped surface 10 of the knuckle bracket 4 and the outer circumference of the outer shell 2, as long as the gap between the C-shaped surface 10 of the knuckle bracket 4 and the outer circumference of the outer shell is sufficiently small, it is possible to form a bead with the knuckle bracket 4 and the outer shell 2, which are materials to be welded, are fused with the filler metal by welding. However, there is a wide gap between the two circumferential ends of the C-shaped surface 10 that as not easily deformable, so, even if the attachment portions 6, 7 are clamped, it is difficult to form a bead in which the members to be welded are fused with the filler metal.

Therefore, with a wide gap between the two circumferential ends of the C-shaped surface 10 and the outer circumference of the outer shell 2, as in the conventional shock absorber, it is not possible to form a highly strong bead in which the materials to be welded are fused with the filler metal, in the parts of the welded portion corresponding to the two respective circumferential ends of the C-shaped surface 10, in the process of welding the entire C-shaped surface 10 to the outer circumference of the outer shell 2. In other words, when the entire C-shaped surface 10 is welded, as in the conventional shock absorber, the bead is brittle in the parts corresponding to the two respective circumferential ends of the C-shaped surface 10 of the welded portion. Therefore, it is not possible to achieve sufficient joining strength in the welded portion between the knuckle bracket 4 and the outer shell 2.

By contrast shock absorber D according to the present embodiment, the C-shaped surface 10 is not entirely welded, and the welded portion 11 is formed across a range from the position spaced from one circumferential end of the C-shaped surface 10, traversing across the upper part of the holding portion 5 on the rear side, to the position spaced from the other circumferential end of the C-shaped surface 10, with the exception of the two circumferential ends of the C-shaped surface 10 of the knuckle bracket 4, the two circumferential ends corresponding to the tips of the reinforcing portions 8, 9 where it is highly likely for a gap to be formed with the outer shell 2. When the welded portion 11 is formed in the manner described above, the welded portion 11 is formed only of a high-strength bead in which the welded materials of the knuckle bracket 4 and the outer shell 2 are sufficiently fused with the filler metal. Therefore, although the length by which the welded portion 11 is welded is shorter in the shock absorber D according to the present embodiment, than that in the conventional shock absorber in which the top end of the knuckle bracket is entirely welded, the joining strength between the knuckle bracket 4 and the outer shell 2 in the welded portion 11 is improved, and the welded portion 11 gains a higher tolerance against repeated applications of high load, compared with the welded portion of the conventional shock absorber.

In the manner described above, the shock absorber D according to the present invention includes: the shock absorber main body 1 having the outer shell 2 and the rod 3 that is movably inserted into the outer shell 2; and the knuckle bracket 4 attached, by welding, to an outer circumference of the bottom end of the outer shell 2. The knuckle bracket 4 includes: the holding portion 5 having a cylindrical shape with a C-shaped cross section and a split on a front side, and that holds the outer circumference of the outer shell 2; a pair of attachment portions 6, 7 extending radially outwards from respective circumferential ends of the holding portion 5 and in parallel with each other, and that are able to be coupled to a knuckle in a vehicle; and reinforcing portions 8, 9 formed by bending top ends of the attachment portions 6, 7 in directions approaching each other, and that holds the outer circumference of the outer shell 2 together with the holding portion 5; and a C-shaped welded portion 11 having a C-shaped surface that is formed by top ends of the reinforcing portions 8, 9 and a top end of the holding portion 5, and that is to be welded along an outer circumference of the outer shell 2, the C-shaped welded portion 11 being formed by welding the C-shaped surface 10 to the outer shell 2, across a range from a position spaced from one circumferential end of the C-shaped surface 10, traversing across an upper part of a rear side of the holding portion 5, to a position spaced from the other circumferential end.

With the shock absorber D having the configuration described above, because welding is performed except for the two circumferential ends of the C-shaped surface 10 of the knuckle bracket 4, the two circumferential ends corresponding to the tips of the reinforcing portions 8, 9, respectively, where it is highly likely for a gap to formed with the outer shell 2, the joining strength between the knuckle bracket 4 and the outer shell 2 is improved, and the tolerance against the repeated applications of high load can be improved. In the shock absorber D including the knuckle bracket 4 provided with the reinforcing portions 8, 9 that are formed by bending the top ends of the attachment portions 6, 7, respectively, in the directions approaching each other, it is possible to improve the tolerance against repeated application of a high load, by forming the welded portion 11 to the range described above.

The bead formed the part where there is a wide gap between one circumferential end of the C-shaped surface 10 of the knuckle bracket 4 and the outer circumference of the outer shell 2 tends to be brittle. As described above, because the knuckle bracket 4 includes the reinforcing portions 8, 9 formed by bending the top ends of the attachment portions 6, 7, the gap between the C-shaped surface 10 and the outer shell 2 tends to be wider at the two circumferential ends of the C-shaped surface 10.

Therefore, when the C-shaped surface 10 of the knuckle bracket 4 is welded to the outer circumference of the outer shell 2, the distance by which the start point and the end point of the welded portion 11 are spaced from the respective circumferential ends of the C-shaped surface 10 may be set as follows. The start point of the bead formation may be set, on the one circumferential end of the C-shaped surface 10, to a point where the gap between the C-shaped surface 10 and the outer circumference of the outer shell 2 is small enough to form a highly strong bead, and the end point of the bead formation may be set, on the other circumferential end of the C-shaped surface 10, to a point immediately before where the gap between the C-shaped surface 10 and the outer circumference of the outer shell 2 reaches a level where a highly strong bead can no longer be formed. In this manner, it is possible to form the welded portion 11 having no brittle part, while ensuring the longest weld length of the welded portion 11. In the present embodiment, the start point and the end point of the welded portion 11 are set to a range of 5 mm or more and 10 mm or less from the respective two circumferential ends of the C-shaped surface 10 of the knuckle bracket 4, so that it is possible to achieve fair joining strength with higher tolerance against repeated applications of high load to the welded portion 11, than that those required in a conventional shock absorber. In this manner, by determining the position where the size of the gap will not result in a brittle bead in advance, and by setting the distances by which one circumferential end of the C-shaped surface 10 is spaced from the start point of the welded portion 11 and by which the other circumferential end of the C-shaped surface 10 is spaced from the end point of the welded portion 11, in consideration of a dimensional error of the knuckle bracket 4, the spring back of the material, and the like in advance, it is possible to save time and effort of measuring the distance of the space every time in each run of manufacturing. Note that, in the shock absorber D according to the present embodiment, the distance by which the one circumferential end of the C-shaped surface 10 is spaced from the start point of the welded portion 11 is set to the same length as the distance by which the other circumferential end of the C-shaped surface 10 is spaced from the end point of the welded portion 11, but these distances may be set to different lengths when the finished product of the knuckle bracket 4 is not laterally symmetrical a view from the front side.

In addition, as illustrated in FIG. 2, the welded portion 11 is preferably provided from a point of intersection between the C-shaped surface 10 and a line E1 extended from the inner surface 6c of the one attachment portion 6 as a start point, to a point of intersection between the C-shaped surface 10 and a line E2 extended from the inner surface 7c of the other attachment portion 7, as an end point, in a view of the knuckle bracket 4 from the front side in a direction facing the attachment portions 6, 7. As described above, even if the attachment portions 6, 7 are clamped in an attempt to weld the knuckle bracket 4 to the outer circumference of the outer shell 2, the reinforcing portions 8, 9, which are obtained by bending the top ends of the attachment portions 6, 7, do not get deformed easily. Therefore, a wide gap is formed between the two circumferential ends of the C-shaped surface 10 and the outer circumference of the outer shell 2. In the reinforcing portions 8, 9, because the strength is particularly high within the range between the lines E1 and E2 extended from the inner surfaces 6c and 7c of the attachment portions 6, 7, respectively, in FIG. 2, the reinforcing portions 8, 9 does not easily get deformed. Therefore, if the welded portion 11 is formed by welding while avoiding this part, highly strong welded portion 11 as a whole can be achieved reliably. In addition, because the positions of the inner surfaces 6c and 7c of the attachment portions 6, 7 are obtained from the design values of the knuckle bracket 4, the range to be welded between the knuckle bracket 4 and the outer shell 2 can be set in advance. In this manner, the welding task is made easier.

As described above, the welded portion 11 is formed across a range from a position spaced from one circumferential end of the C-shaped surface 10 of the knuckle bracket 4, traversing across an upper part of the holding portion 5 on the rear side, and to a position spaced from the other circumferential end of the C-shaped surface 10, with the exception of the two circumferential ends of the C-shaped surface 10. However, even if the welded portion 11 is formed from the position spaced from the one circumferential end of the C-shaped surface 10, across the upper part of the holding portion 5 on the rear side, to the other circumferential end of the C-shaped surface 10, an improvement in the welding strength can be expected on the side of the one end of the C-shaped surface 10. Therefore, the welded portion 11 may be provided across a range from a position spaced from the one circumferential end of the C-shaped surface 10, across the upper part of the holding portion 5 on the rear side, to the other circumferential end of the C-shaped surface 10. Therefore, when the welded portion 11 is formed across a range from a position spaced from the one circumferential end of the C-shaped surface 10, traversing across the upper part of the holding portion 5 on the rear side, to a position spaced from the other circumferential end of the C-shaped surface 10, it is possible to achieve welding strength and tolerance higher than those of the welded portion in the conventional shock absorber.

However, in order to further improve the welding strength and to obtain the welded portion 11 having tolerance against repeated applications of high load, it is preferable for the welded portion 11 to be provided across a range from a position spaced from the one circumferential end of the C-shaped surface 10, traversing across the upper part of the holding portion 5 on the rear side, to a position spaced from the other circumferential end of the C-shaped surface 10.

Furthermore, the welded portion 11 may be provided in a manner divided into as a plurality of portions, without being formed continuously without any break, across a range, as long as the range covers a range starting from a position spaced from one circumferential end of the C-shaped surface 10, traversing across the upper part of the holding portion 5 on the rear side, and to the other circumferential end of the C-shaped surface 10. The welded portion it may be divided into a plurality of portions in the manner described above. This is also applicable to an example in which the welded portion 11 is formed across a range from a position spaced from the one circumferential end of the C-shaped surface 10, traversing across the upper part of the holding portion 5 on the rear side, to a position spaced from the other circumferential end of the C-shaped surface 10.

Although the preferred embodiment of the present invention has been described above in detail, modifications, variations, and changes are still possible without departing from the scope of the claims.

REFERENCE SIGNS LIST

1 shock absorber main body
2 outer shell
3 rod
4 knuckle bracket
5 holding portion
6, 7 attachment portion
6c, 7c inner surface of attachment portion
8, 9 reinforcing portion
10 C-shaped surface
11 welded portion
E1, E2 extension line
D shock absorber

The invention claimed is:

1. A shock absorber comprising:
a shock absorber main body having an outer shell and a rod that is movably inserted into the outer shell; and
a knuckle bracket attached, by welding, to an outer circumference of a bottom end of the outer shell, wherein
the knuckle bracket includes: a holding portion that has a cylindrical shape with a C-shaped cross section with a split on a front side, and that holds an outer circumference of the outer shell; a pair of attachment portions that extend radially outwards, and in parallel with each other, from two respective circumferential ends of the holding portions, and that are able to be coupled to a knuckle in a vehicle; and reinforcing portions formed by bending top ends of the attachment portions, in a direction approaching each other, and that holds the outer circumference of the outer shell together with the holding portion; and a C-shaped welded portion having a C-shaped surface that is formed by top ends of the reinforcing portions and a top end of the holding portion, and that is to be welded along an outer circumference of the outer shell, the C-shaped welded portion being formed by welding the C-shaped surface to the outer shell, across a range from a position spaced from one circumferential end of the C-shaped surface, traversing across an upper part of a rear side of the holding portion, to another circumferential end of the C-shaped surface.

2. The shock absorber according to claim 1, wherein
the welded portion is formed by welding the C-shaped surface to the outer shell across a range from a position spaced from one circumferential end of the C-shaped surface, traversing across an upper part of the holding portion, to a position spaced from the other circumferential end.

3. The shock absorber according to claim 2, wherein
in a view of the knuckle bracket from a front side in a direction facing the attachment portion, the welded portion is formed from a start point at a point of intersection between the C-shaped surface and a line extended from one of the attachment portions as a start point, to a point of intersection between the C-shaped surface and a line extended from another one of the attachment portions, as an end point.

4. The shock absorber according to claim 2, wherein
a gap between the C-shaped surface and the outer shell is wider at two circumferential ends of the C-shaped surface than that across the range from the position spaced from the one circumferential end of the C-shaped surface, traversing across the upper part of the holding portion on the rear side, and to the position spaced from the other circumferential end.

5. The shock absorber according to claim 1, wherein
the welded portion is formed by welding the C-shaped surface and the outer shell across a range from a position spaced by 5 mm or more and 10 mm or less from the one circumferential end of the C-shaped surface, traversing across the upper part of the holding portion on the rear side, and to a position spaced by 5 mm or more and 10 mm or less from the other circumferential end.

* * * * *